(12) United States Patent
Shimakawa (10) Patent No.: US 12,535,642 B2
(45) Date of Patent: Jan. 27, 2026

(54) OPTICAL FIBER BUNDLE CONNECTOR AND METHOD OF MANUFACTURING OPTICAL FIBER BUNDLE CONNECTOR

(71) Applicant: SUMITOMO ELECTRIC INDUSTRIES, LTD., Osaka (JP)

(72) Inventor: Osamu Shimakawa, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 266 days.

(21) Appl. No.: 18/218,682

(22) Filed: Jul. 6, 2023

(65) Prior Publication Data

US 2024/0036273 A1 Feb. 1, 2024

(30) Foreign Application Priority Data

Jul. 27, 2022 (JP) ................................ 2022-119808

(51) Int. Cl.
*G02B 6/40* (2006.01)
*G02B 6/38* (2006.01)

(52) U.S. Cl.
CPC ........... *G02B 6/403* (2013.01); *G02B 6/3821* (2013.01); *G02B 6/3862* (2013.01); *G02B 6/3885* (2013.01); *G02B 6/3897* (2013.01)

(58) Field of Classification Search
CPC .................................................. G02B 6/40

(Continued)

(56) References Cited

U.S. PATENT DOCUMENTS 4,807,962 A * 2/1989 Arroyo .............. G02B 6/44382
385/105
4,909,592 A * 3/1990 Arroyo ................ G02B 6/4435
385/113

(Continued)

FOREIGN PATENT DOCUMENTS

CA 2395153 C * 3/2010 ........... G02B 6/4416
JP 2013-068891 A 4/2013

(Continued)

OTHER PUBLICATIONS

Ryo Nagase et al.; "History of fiber optic physical contact connector for low insertion and high return losses"; 2017 IEEE History of Electrotechnology CONference (HISTELCON); 2017; pp. 113-116.

*Primary Examiner* — Kaveh C Kianni
(74) *Attorney, Agent, or Firm* — Oliff PLC (57) ABSTRACT

An optical fiber bundle connector includes a plurality of optical fibers, a plastic tube, a ferrule, an intermediate member, a frame member, and a pressing member. A portion of each of the plurality of optical fibers is inserted in the plastic tube. The ferrule extends in a first direction and holds tip portions of the plurality of optical fibers. The intermediate member has a cylindrical shape. The plurality of optical fibers are inserted in the intermediate member. The intermediate member connects the plastic tube and the ferrule. The frame member accommodates at least a portion of the ferrule, the intermediate member, and at least a portion of the plastic tube. The pressing member is disposed around the intermediate member and configured to press the ferrule toward a tip side of each of the plurality of optical fibers against the frame member.

10 Claims, 10 Drawing Sheets

(58) Field of Classification Search
USPC .......................................................... 385/39
See application file for complete search history.

(56) References Cited

U.S. PATENT DOCUMENTS

| | | | | |
|---|---|---|---|---|
| 5,016,970 A * | 5/1991 | Nagase | ................ | G02B 6/3869 385/60 |
| 5,054,879 A * | 10/1991 | Brown | ................ | G02B 6/3873 385/59 |
| 5,109,458 A * | 4/1992 | Dixit | ................ | G02B 6/4428 385/102 |
| 5,636,306 A * | 6/1997 | Mock | ................ | G02B 6/4416 385/100 |
| 5,682,451 A * | 10/1997 | Lee | ................ | G02B 6/3869 385/60 |
| 5,751,879 A * | 5/1998 | Graham | ................ | G02B 6/4479 385/103 |
| 5,822,484 A * | 10/1998 | Arroyo | ................ | G02B 6/4416 385/112 |
| 5,845,029 A * | 12/1998 | Matsuoka | ................ | G02B 6/3851 385/86 |
| 6,011,218 A * | 1/2000 | Burek | ................ | H01R 4/646 439/98 |
| 6,113,283 A * | 9/2000 | Blom | ................ | G02B 6/4292 385/88 |
| 6,908,233 B2 * | 6/2005 | Nakajima | ................ | G02B 6/3825 385/53 |
| 6,973,244 B2 * | 12/2005 | Karlsen | ................ | F16L 9/20 385/100 |
| 9,547,096 B1 * | 1/2017 | Kumar | ................ | G01V 1/162 |
| 10,180,541 B2 * | 1/2019 | Coenegracht | ........ | G02B 6/3825 |
| 10,690,860 B2 * | 6/2020 | Ling | ................ | G02B 6/3825 |
| 10,788,640 B2 * | 9/2020 | Smith | ................ | G02B 6/4454 |
| 2003/0044139 A1 * | 3/2003 | Norris | ................ | G02B 6/4429 385/113 |
| 2008/0056652 A1 * | 3/2008 | Nothofer | ............. | G02B 6/4432 385/113 |
| 2012/0281951 A1 * | 11/2012 | Takahashi | ............ | G02B 6/3846 156/60 |
| 2015/0294541 A1 * | 10/2015 | Wilson | ................ | G08B 13/124 340/550 |
| 2017/0285274 A1 * | 10/2017 | Matsumoto | .......... | G02B 6/3821 |
| 2019/0101704 A1 * | 4/2019 | Morishima | ............ | G02B 6/387 |
| 2019/0101705 A1 * | 4/2019 | Morishima | ............ | G02B 6/387 |
| 2019/0101709 A1 * | 4/2019 | Wang | ................ | G02B 6/3877 |
| 2019/0278032 A1 * | 9/2019 | Sato | ................ | G02B 6/3831 |
| 2020/0301081 A1 * | 9/2020 | Morishima | ............ | G02B 6/3837 |
| 2021/0333483 A1 * | 10/2021 | Morishima | .......... | G02B 6/3833 |

FOREIGN PATENT DOCUMENTS

| | | | | |
|---|---|---|---|---|
| WO | WO-2005015280 A1 * | 2/2005 | ........... | G02B 6/4433 |
| WO | WO-2005040882 A1 * | 5/2005 | ............. | G02B 6/441 |
| WO | WO-2013169850 A1 * | 11/2013 | ............. | F16L 11/02 |
| WO | 2020/149262 A1 | 7/2020 | | |

* cited by examiner

OPTICAL FIBER BUNDLE CONNECTOR AND METHOD OF MANUFACTURING OPTICAL FIBER BUNDLE CONNECTOR

CROSS REFERENCE TO RELATED APPLICATIONS

This application claims priority based on Japanese Patent Application No. 2022-119808 filed on Jul. 27, 2022, and the entire contents of the Japanese patent application are incorporated herein by reference.

TECHNICAL FIELD

The present disclosure relates to an optical fiber bundle connector and a method of manufacturing an optical fiber bundle connector.

BACKGROUND

In PTL 1, an optical fiber bundle connector is disclosed. The optical fiber bundle connector includes a plurality of optical fibers, a ferrule, a frame member, and a pressing member. The ferrule extends in a first direction. The ferrule holds the tip portions of the plurality of optical fibers. The frame member accommodates at least a portion of the ferrule. The pressing member presses the ferrule toward the tip side of the plurality of optical fibers against the frame member.

PTL 1: International Publication WO 2020/149262
PTL 2: Japanese Unexamined Patent Application Publication No. 2013-68891
Non-PTL 1: Ryo Nagase et al. "History of fiber optic physical contact connector for low insertion and high return losses" 2017 IEEE History of Electrotechnology Conference, 113-116

SUMMARY

An optical fiber bundle connector according to the present disclosure includes a plurality of optical fibers, a plastic tube, a ferrule, an intermediate member, a frame member, and a pressing member. A portion of each of the plurality of optical fibers is inserted in the plastic tube. The ferrule extends in a first direction and holds a tip portion of each of the plurality of optical fibers. The intermediate member has a cylindrical shape. The plurality of optical fibers are inserted in the intermediate member. The intermediate member connects the plastic tube and the ferrule. The frame member accommodates at least a portion of the ferrule, the intermediate member, and at least a portion of the plastic tube. The pressing member is disposed around the intermediate member and configured to press the ferrule against the frame member toward a tip side of each of the plurality of optical fibers.

A method of manufacturing an optical fiber bundle connector according to the present disclosure includes; inserting each of a plurality of optical fibers, a portion of each of which is accommodated in a plastic tube, into an intermediate member starting from a tip portion of each of the plurality of optical fibers, and causing a tip portion of the plastic tube to be held by the intermediate member; connecting a ferrule to the intermediate member, and disposing a pressing member around the intermediate member; and accommodating at least a portion of the ferrule, the intermediate member, and at least a portion of the plastic tube in a frame member, and, by the pressing member, pressing the ferrule against the frame member toward a tip side of each of the plurality of optical fibers. The intermediate member has a cylindrical shape. The ferrule extending in a first direction and configured to hold a tip of each of the plurality of optical fibers.

DETAILED DESCRIPTION

In the optical fiber bundle connector disclosed in PTL 1, the ferrule is pressed by the pressing member and moves relative to the frame member in the first direction. In this case, the optical fiber that is not protected by a protective tube or the like may be bent, and bending loss may occur in the optical fiber. In particular, when a plurality of optical fibers are held by the ferrule, the bending loss in each optical fiber is more likely to occur. Due to the bending of the optical fiber, the optical fiber may be broken.

An object of the present disclosure is to provide an optical fiber bundle connector capable of reducing bending loss and breakage of an optical fiber, and a method of manufacturing the optical fiber bundle connector.

Description of Embodiments of Present Disclosure

First, embodiments of the present disclosure will be listed and explained.

(1) An optical fiber bundle connector according to the present disclosure includes a plurality of optical fibers, a plastic tube, a ferrule, an intermediate member, a frame member, and a pressing member. A portion of each of the plurality of optical fibers is inserted in the plastic tube. The ferrule extends in a first direction and holds a tip portion of each of the plurality of optical fibers. The intermediate member has a cylindrical shape. The plurality of optical fibers are inserted in the intermediate member. The intermediate member connects the plastic tube and the ferrule. The frame member accommodates at least a portion of the ferrule, the intermediate member, and at least a portion of the plastic tube. The pressing member is disposed around the intermediate member and configured to press the ferrule against the frame member toward a tip side of each of the plurality of optical fibers.

In this optical fiber bundle connector, the portion of each of the plurality of optical fibers is inserted into the plastic tube. The intermediate member connects the plastic tube and the ferrule. The pressing member is disposed around the intermediate member. Therefore, the optical fiber is protected by the plastic tube, and damage to the optical fiber can be reduced. The plastic tube may move together with the ferrule through the intermediate member. Therefore, bending loss and breakage of the optical fiber may be reduced.

(2) In the optical fiber bundle connector according to (1), the ferrule may include a first end portion and a second end portion. The first end portion and the second end portion may be opposite to each other in the first direction. The first end portion may be positioned on the tip side of each of the plurality of optical fibers with respect to the second end portion. The intermediate member may connect to the second end portion and a tip of the plastic tube. In this case, the plastic tube can be easily disposed by the intermediate member.

(3) In the optical fiber bundle connector according to (2), the intermediate member may include a flange and a sleeve. The flange may hold the second end portion of the ferrule. The sleeve may be connected to the flange. The sleeve may hold the tip of the plastic tube. The pressing member may include a coil spring having a first tip portion and a second tip portion. The frame member may include an engaging portion engaging with the first tip portion of the coil spring. The engaging portion may have a ring shape when viewed from the first direction. An inside diameter of the engaging portion of the frame member may be larger than a maximum outside diameter of the sleeve. In this case, the entire sleeve can be passed inside the engaging portion of the frame member. Therefore, the optical fiber bundle connector has a configuration that can be easily manufactured.

(4) In the optical fiber bundle connector according to (3), the sleeve may include a first portion and a second portion. The first portion may be connected to the flange. The second portion may hold the tip of the plastic tube. An inside diameter of the coil spring may be larger than a maximum outside diameter of the first portion. In this case, at least the first portion may be inserted into the coil spring. Therefore, the optical fiber bundle connector can easily realize a configuration in which the plastic tube moves together with the ferrule with respect to the frame member.

(5) In the optical fiber bundle connector according to (4), the flange may include an engaging portion. The engaging portion of the flange may engage with the second tip portion of the coil spring. The shortest distance between the engaging portion of the frame member and the engaging portion of the flange in the first direction may be shorter than a natural length of the coil spring. The shortest distance between the engaging portion of the flange and the second portion of the sleeve in the first direction may be longer than the natural length of the coil spring. In this case, the optical fiber bundle connector has a structure capable of easily realizing a configuration in which the pressing member presses the ferrule toward a tip side of each of the plurality of optical fibers against the frame member while having the intermediate member including the flange and the sleeve.

(6) In the optical fiber bundle connector of any one of (3) to (5), the flange and the sleeve may be connected by press-fitting. In this case, the number of steps can be reduced as compared with the case where another material such as fixing adhesive is used for connection between the flange and the sleeve.

(7) In the optical fiber bundle connector according to any one of (3) to (5), the flange and the sleeve may be connected with an adhesive.

(8) In the optical fiber bundle connector according to any one of (3) to (5), the flange and the sleeve may be integrally molded. In this case, the number of steps of disposing the intermediate member may be reduced.

(9) In the optical fiber bundle connector according to any one of (1) to (8), the plastic tube may include a plurality of plastic tubes. Each of the plurality of optical fibers may be individually inserted into a corresponding one of the plurality of plastic tubes. In this case, since the optical fiber is inserted into each plastic tube, each of the plurality of optical fibers is protected by the plastic tube.

(10) A method of manufacturing an optical fiber bundle connector according to an embodiment of the present disclosure includes; inserting each of a plurality of optical fibers, a portion of each of which is accommodated in a plastic tube, into an intermediate member starting from a tip portion of each of the plurality of optical fibers, and causing a tip portion of the plastic tube to be held by the intermediate member; connecting a ferrule to the intermediate member, and disposing a pressing member around the intermediate member; and accommodating at least a portion of the ferrule, the intermediate member, and at least a portion of the plastic tube in a frame member, and, by the pressing member, pressing the ferrule against the frame member toward a tip side of each of the plurality of optical fibers. The intermediate member has a cylindrical shape. The ferrule is extending in a first direction and configured to hold a tip of each of the plurality of optical fibers. In the optical fiber bundle connector manufactured by the manufacturing method described above, the optical fiber is protected by the plastic tube, and damage to the optical fiber can be reduced. The plastic tubes may move together with the ferrule through the intermediate member. Therefore, bending loss and breakage of the optical fiber may be reduced.

Details of Embodiments of Present Disclosure

Specific examples of embodiments of the present disclosure are described below with reference to the drawings. The present invention is not limited to these examples, but is defined by the scope of the claims, and is intended to include all modifications within the meaning and scope equivalent to the scope of the claims. In the description of the drawings, the same elements are denoted by the same reference numerals, and redundant description is omitted.

Figure 1:
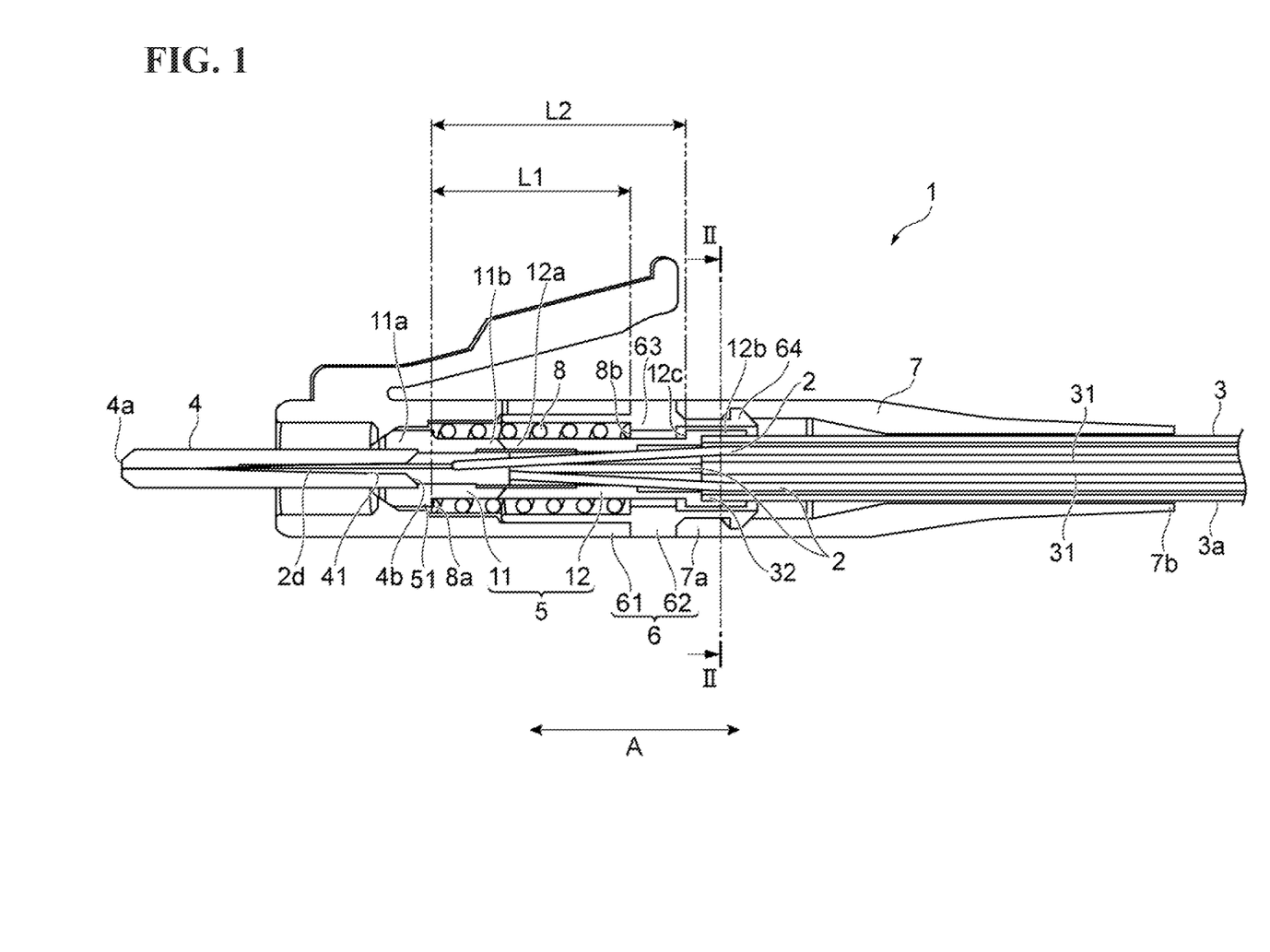
FIG. 1 is a cross-sectional view showing an optical fiber bundle connector according to an embodiment.
Figure 2:
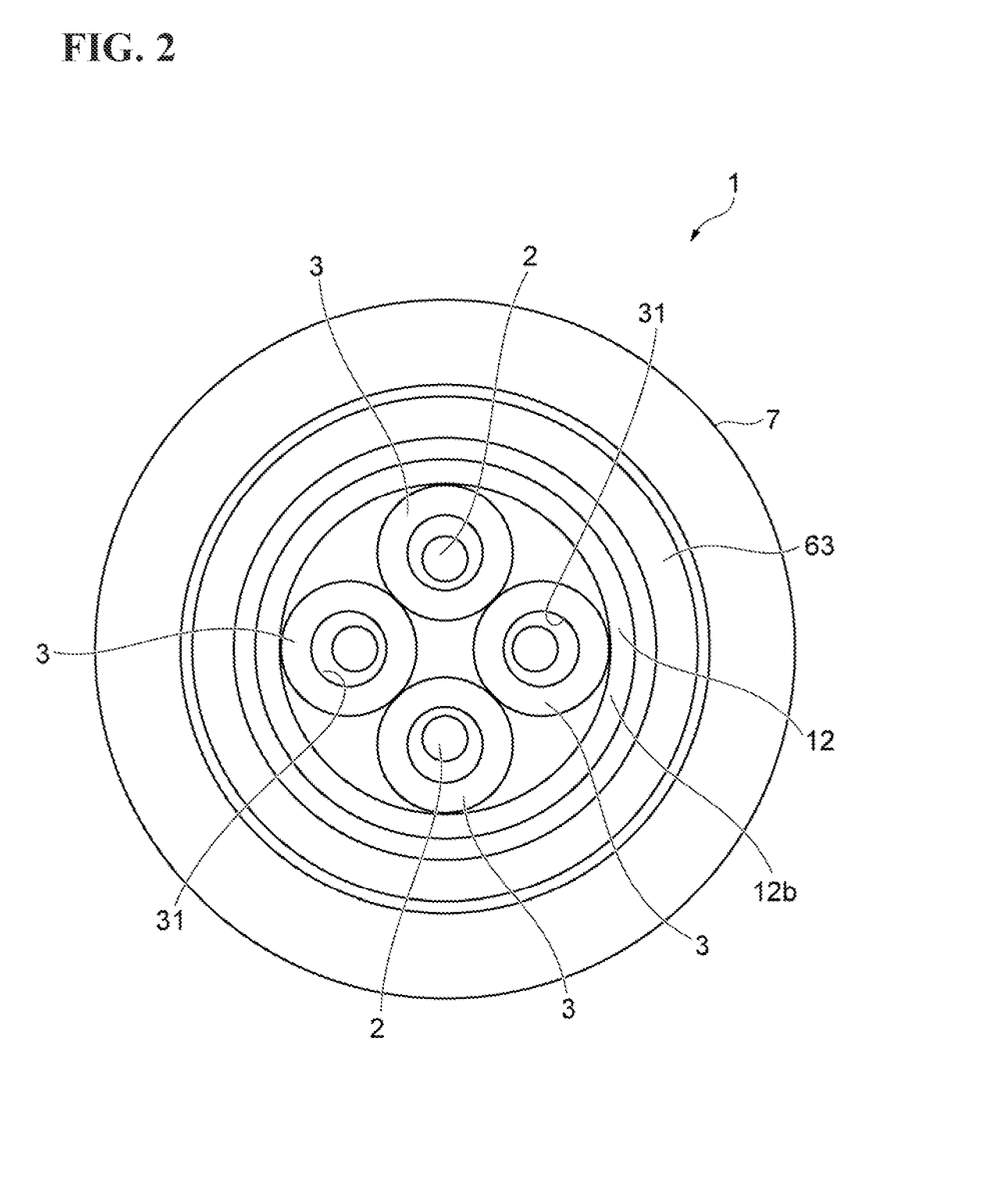
FIG. 2 is a cross-sectional view of the optical fiber bundle connector shown in FIG. 1 taken along line II-II.

FIG. 1 is a cross-sectional view showing an optical fiber bundle connector in one embodiment. FIG. 2 is a cross-sectional view of the optical fiber bundle connector shown in FIG. 1 taken along line II-II.

Figure 3:
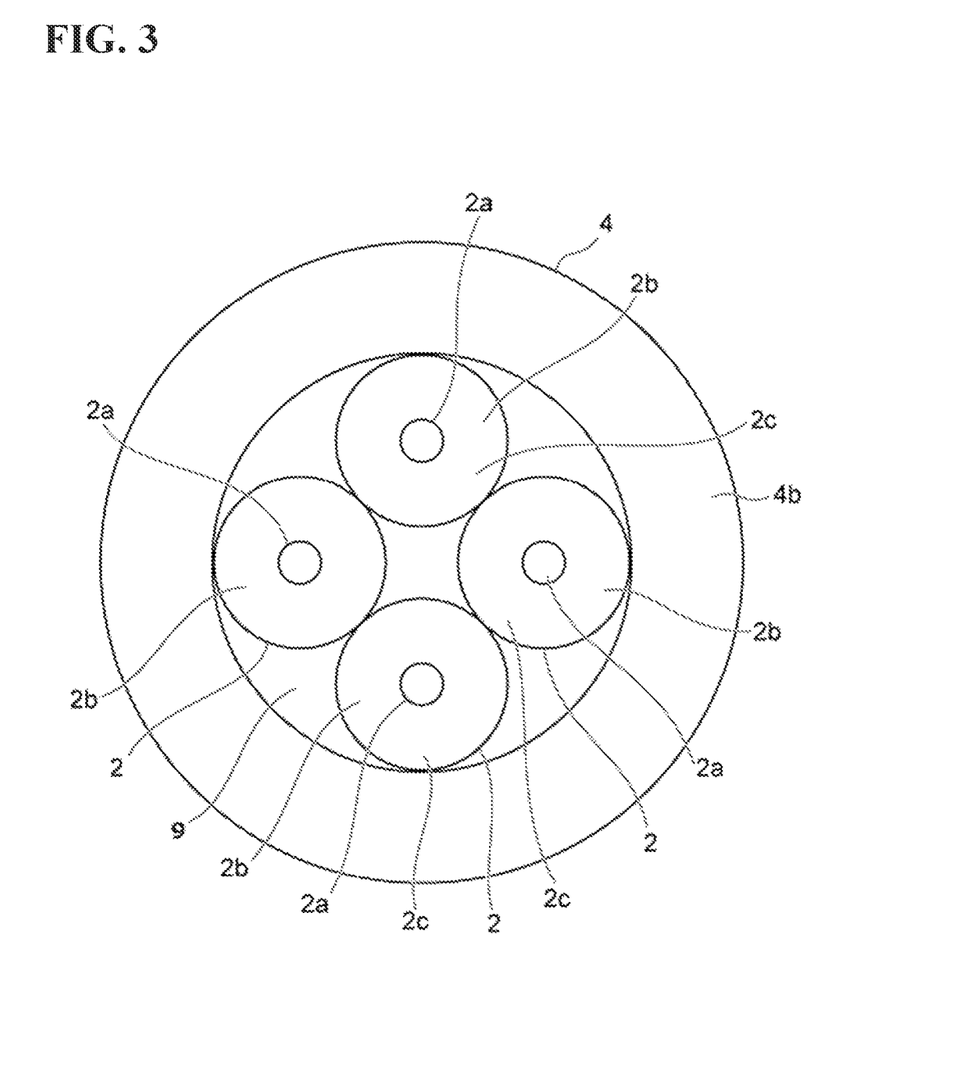
FIG. 3 shows end surfaces of optical fibers and a ferrule of an optical fiber bundle connector.

As shown in FIGS. 1 to 3, an optical fiber bundle connector 1 includes a plurality of optical fibers 2, plastic tubes 3, a ferrule 4, an intermediate member 5, a frame member 6, a rubber boot 7, and a pressing member 8. In optical fiber bundle connector 1, the plurality of optical fibers 2, plastic tubes 3, ferrule 4, and intermediate member 5 are arranged to be movable in a direction A (first direction) with respect to frame member 6, rubber boot 7, and pressing member 8. In optical fiber bundle connector 1, the plurality of optical fibers 2, plastic tubes 3, ferrule 4, and intermediate member 5 are not fixed to frame member 6, rubber boot 7, or pressing member 8, and are in a floating state. FIG. 3 shows end surfaces of the optical fibers and the ferrule of the optical fiber bundle connector.

Optical fiber bundle connector 1 is connected to an optical fiber connector (not shown). The optical fiber connector to which optical fiber bundle connector 1 is connected is, for example, a multi-fiber connector. For example, optical fiber bundle connector 1 optically connects the plurality of optical fibers 2 and the multi-core fiber (hereinafter also referred to as "MCF") in the optical fiber connector (not shown). The MCF includes, for example, a plurality of cores each extending in direction A and a cladding covering the plurality of cores. For example, by the connection of optical fiber bundle connector 1 and the optical fiber connector (not shown), ferrule 4 and the ferrule (not shown) holding the MCF are aligned so that the optical axis of each core of the MCF is aligned with the optical axis of each core of the plurality of optical fibers 2. In an optical connection structure constituted by the connection optical fiber bundle connector 1 and the optical fiber connector (not shown), at least one of the plurality of cores included in the MCF and at least one core of the plurality of optical fibers 2 are optically coupled.

As shown in FIG. 3, each optical fiber 2 has a core 2a extending in direction A, a cladding 2b extending in direction A and covering core 2a, and a tip surface 2c. FIG. 3 shows the ends of the plurality of optical fibers 2 and the end surface of ferrule 4. Tip surface 2c is composed of the tip of core 2a and the tip of cladding 2b. Core 2a may be made of silica glass to which a dopant such as germanium dioxide is added to increase the refractive index, and cladding 2b may be made of silica glass to which a dopant such as fluoride is added to decrease the refractive index, and the combination of materials, dopants, and the like can be appropriately selected. In optical fibers 2, an optical signal having a predetermined wavelength is propagated by each core 2a. Each of the plurality of optical fibers 2 is a single core optical fiber having one core. As a modification of the embodiment of the present disclosure, each of the plurality of optical fibers 2 may have, for example, an optical fiber bundle structure including a multi-core optical fiber, or a structure in which a single-core optical fiber and a multi-core optical fiber are mixed.

Optical fibers 2 are two dimensionally arranged when viewed from direction A. As shown in FIG. 2, for example, the plurality of optical fibers 2 are four optical fibers 2. Each optical fiber 2 is, for example, a single-mode optical fiber. Each optical fiber 2 has a single-peaked refractive index distribution profile. As a modification of the embodiment of the present disclosure, each optical fiber 2 may have a layer having a refractive index lower than that of cladding 2b between core 2a and cladding 2b, and may have a trench assisted type refractive index distribution profile. As a modification of the embodiment of the present disclosure, each optical fiber 2 may be a multimode type optical fiber.

The number and the arrangement of cores 2a of optical fiber 2 correspond to the number and the arrangement of the plurality of cores of the optical fiber in the optical fiber connector connected to optical fiber bundle connector 1. Specifically, the arrangement of cores 2a of the plurality of optical fibers 2 coincides with the arrangement of the plurality of cores of the optical fiber in the optical fiber connector connected to optical fiber bundle connector 1. The total number and arrangement of cores 2a of the plurality of optical fibers 2 may not necessarily coincide with the number and the arrangement of the plurality of cores of the optical fiber in the optical fiber connector connected to optical fiber bundle connector 1, and a configuration in which some of the cores are not optically connected may be adopted.

Plastic tube 3 has a tube shape and accommodates a part of optical fiber 2. Plastic tube 3 has flexibility. A part of each of the plurality of optical fibers 2 is inserted into plastic tube 3. For example, plastic tube 3 includes a plurality of plastic tubes 3. The plurality of plastic tubes 3 may be integrally formed, or may be connected as one bundle by an adhesive. Plastic tube 3 includes an outer periphery 3a of single bundle. Each plastic tube 3 includes a through hole 31. Plastic tube 3 includes a plurality of through holes 31 spaced apart from each other. Each of the plurality of optical fibers 2 is inserted into respective one of the plurality of through holes 31. At least a tip portion 2d of each optical fiber 2 is exposed from plastic tube 3.

Ferrule 4 extends in direction A. Ferrule 4 collectively holds tip portions 2d of the plurality of optical fibers 2. For example, ferrule 4 collectively holds tip portions 2d of four optical fibers 2. For example, ferrule 4 has a cylindrical shape. Ferrule 4 includes a pair of end portions 4a and 4b. End portions 4a and 4b are opposed to each other in direction A. End portion 4a is located closer to the tip side of each of the plurality of optical fibers 2 than end portion 4b. When end portion 4a is the first end portion, end portion 4b corresponds to the second end portion.

Ferrule 4 has an inner hole 41. Inner hole 41 corresponds to a through hole that accommodates each tip portion 2d of the plurality of optical fibers 2. As shown in FIG. 3, ferrule 4 fixes each tip portion 2d of the plurality of optical fibers 2 to inner hole 41 by an adhesive portion 9 so that each tip surface 2c of the plurality of optical fibers 2 is exposed inside end portion 4a. The inside diameter of inner hole 41 is equal to or slightly larger than the outside diameter of the bundle of the plurality of optical fibers 2, and tip portions 2d of the plurality of optical fibers 2 are inserted into inner hole 41 and bonded and fixed by an adhesive portion 9 filled in the gap between them. Ferrule 4 is made of, for example, a ceramic material such as zirconia or a glass material.

Adhesive portion 9 is, for example, a connection adhesive. Adhesive portion 9 is, for example, a thermosetting adhesive, and can be cured by heating adhesive portion 9 after adhesive portion 9 is injected into a predetermined position. When ferrule 4 is mainly made of a ceramic material, adhesive portion 9 is, for example, a thermosetting epoxy-based adhesive or a thermosetting acrylic adhesive. When ferrule 4 is mainly made of a glass material, adhesive portion 9 is, for example, a thermosetting epoxy adhesive, a thermosetting acrylic adhesive, an ultraviolet-curing epoxy adhesive, or an ultraviolet-curing acrylic adhesive. Adhesive portion 9 does not depend on the material of ferrule 4 and is not limited thereto.

Intermediate member 5 has a cylindrical shape. The plurality of optical fibers 2 are inserted into intermediate member 5. Intermediate member 5 connects plastic tubes 3 and ferrule 4. Intermediate member 5 connects end portion 4b of ferrule 4 and a tip portion 32 of plastic tube 3. Intermediate member 5 includes a flange 11 and a sleeve 12.

Flange 11 holds end portion 4b of ferrule 4. Flange 11 accommodates portions of the plurality of optical fibers 2. Flange 11 has a cylindrical shape. Flange 11 holds ferrule 4 and the plurality of optical fibers 2. End portion 4b of ferrule 4 is fixed in flange 11 by, for example, an adhesive. Flange 11 is made of, for example, metal or plastic.

Flange 11 includes a portion 11a and a portion 11b. Portion 11a is closer to tip portion 2d of optical fiber 2 than portion 11b. The maximum outside diameter of portion 11a is larger than the maximum outside diameter of portion 11b. Flange 11 holds end portion 4b of ferrule 4 in portion 11a. Portion 11a of flange 11 includes an engaging portion 51. Engaging portion 51 is, for example, a step formed by the difference between the outside diameter of portion 11a and the outside diameter of portion 11b. Engaging portion 51 of flange 11 is engaged with pressing member 8.

Sleeve 12 is connected to flange 11. Sleeve 12 holds tip portion 32 of plastic tubes 3. Sleeve 12 accommodates portions of the plurality of optical fibers 2. Sleeve 12 has a cylindrical shape. Sleeve 12 holds plastic tubes 3 and the plurality of optical fibers 2. Tip portion 32 of plastic tube 3 is fixed in sleeve 12 by, for example, an adhesive. Tip portion 32 of plastic tube 3 may be fixed in sleeve 12 by, for example, press-fitting. Sleeve 12 is made of, for example, metal or plastic.

Sleeve 12 includes a portion 12a and a portion 12b. Portion 12a is closer to tip portion 2d of optical fiber 2 than portion 12b. The maximum outside diameter of portion 12b is larger than the maximum outside diameter of portion 12a. Sleeve 12 includes a step 12c formed by the difference between the outside diameter of portion 12b and the outside diameter of portion 12a. Portion 12a is connected to portion 11b of flange 11. Portion 12b holds tip portion 32 of plastic tube 3. Portion 11b of flange 11 and portion 12a of sleeve 12 are connected by press-fitting, for example. As a modification of the embodiment of the present disclosure, portion 11b of flange 11 and portion 12a of sleeve 12 may be connected by adhesive. Flange 11 and sleeve 12 may be integrally molded.

Frame member 6 has a cylindrical shape. The plurality of optical fibers 2, plastic tubes 3, ferrule 4, intermediate member 5, and pressing member 8 are inserted into frame member 6. Frame member 6 accommodates at least a part of ferrule 4, intermediate member 5 and a part of plastic tube 3. Frame member 6 includes a plug frame 61 and a stopper 62. Plug frame 61 and stopper 62 are connected to each other by, for example, an adhesive. Plug frame 61 accommodates a part of ferrule 4, a part of intermediate member 5, and a part of pressing member 8. Ferrule 4 protrudes from plug frame 61. Stopper 62 accommodates a part of ferrule 4, a part of intermediate member 5, a part of pressing member 8, and a part of plastic tube 3.

Stopper 62 includes engaging portions 63, 64. For example, engaging portion 63 protrudes toward optical fiber 2. Engaging portion 63 is engaged with pressing member 8. Engaging portion 63 is formed in a ring shape when viewed from direction A, for example. The inside diameter of engaging portion 63 is larger than the maximum outside diameter of sleeve 12. Engaging portion 64 protrudes, for example, in a direction away from optical fiber 2. Engaging portion 64 is engaged with rubber boot 7.

Rubber boot 7 has a tube shape, for example, and accommodates portions of the plurality of optical fibers 2, plastic tubes 3, and a part of stopper 62. Rubber boot 7 has flexibility. Rubber boot 7 includes a tip portion 7a and a tip portion 7b. Tip portion 7a is connected to stopper 62. For example, tip portion 7a is fixed to engaging portion 64 of stopper 62 by an adhesive. Tip portion 7b is in contact with outer periphery 3a of the bundle of the plurality of plastic tubes 3. For example, tip portion 7b slides relative to outer periphery 3a in response to an external force.

Pressing member 8 is arranged around intermediate member 5. Pressing member 8 presses ferrule 4 toward the tip side of each of the plurality of optical fibers 2 against the frame member 6. Pressing member 8 includes a coil spring having a pair of tip portions 8a, 8b. When tip portion 8b corresponds to the first tip portion, tip portion 8a corresponds to the second tip portion. Hereinafter, pressing member 8 is also referred to as a "coil spring 8".

Coil spring 8 is spirally formed along the outer periphery of portion 11b of flange 11 and the outer periphery of portion 12a of sleeve 12. Specifically, portion 11b of flange 11 and portion 12a of sleeve 12 are inserted inside coil spring 8.

The inside diameter of coil spring 8 is larger than the maximum outside diameter of portion 11b of flange 11 and the maximum outside diameter of portion 12a of sleeve 12. The inside diameter of coil spring 8 is smaller than the maximum outside diameter of portion 11a of flange 11. The inside diameter of coil spring 8 is larger than the inside diameter of engaging portion 63 of frame member 6.

Tip portion 8a engages with engaging portion 51 of flange 11. In an example according to the embodiment of the present disclosure, tip portion 8a abuts engaging portion 51. As a modification of the embodiment of the present disclosure, tip portion 8a may be engaged with engaging portion 51 via another member such as a washer. In this modification, tip portion 8a abuts the washer and the washer abuts engaging portion 51.

Tip portion 8b engages with engaging portion 63 of frame member 6. In an example in the embodiment of the present disclosure, tip portion 8b abuts engaging portion 63. As a modification of the embodiment of the present disclosure, tip portion 8b may be engaged with engaging portion 63 via another member such as a washer. The washer is disposed between tip portion 8b of coil spring 8 and engaging portion 63 of frame member 6. In this modification, tip portion 8b abuts the washer and the washer abuts engaging portion 63. In this case, even when the inside diameter of engaging portion 63 is enlarged, an area with which tip portion 8b of coil spring 8 abuts is secured. Therefore, the inside diameter of engaging portion 63 can be enlarged while entire frame member 6 is made compact.

The shortest distance L1 between engaging portion 51 of flange 11 and engaging portion 63 of frame member 6 in direction A is, for example, shorter than a natural length of coil spring 8. The shortest distance L2 between engaging portion 51 of flange 11 and portion 12b of sleeve 12 in direction A may be longer than the natural length of coil spring 8. The shortest distance L2 corresponds to the shortest distance between engaging portion 51 of flange 11 and step 12c of sleeve 12 in direction A.

Next, a method of manufacturing optical fiber bundle connector 1 will be described with reference to FIGS. 4 to 10. FIGS. 4 to 10 show manufacturing steps of the optical fiber bundle connector, respectively.

Figure 4:
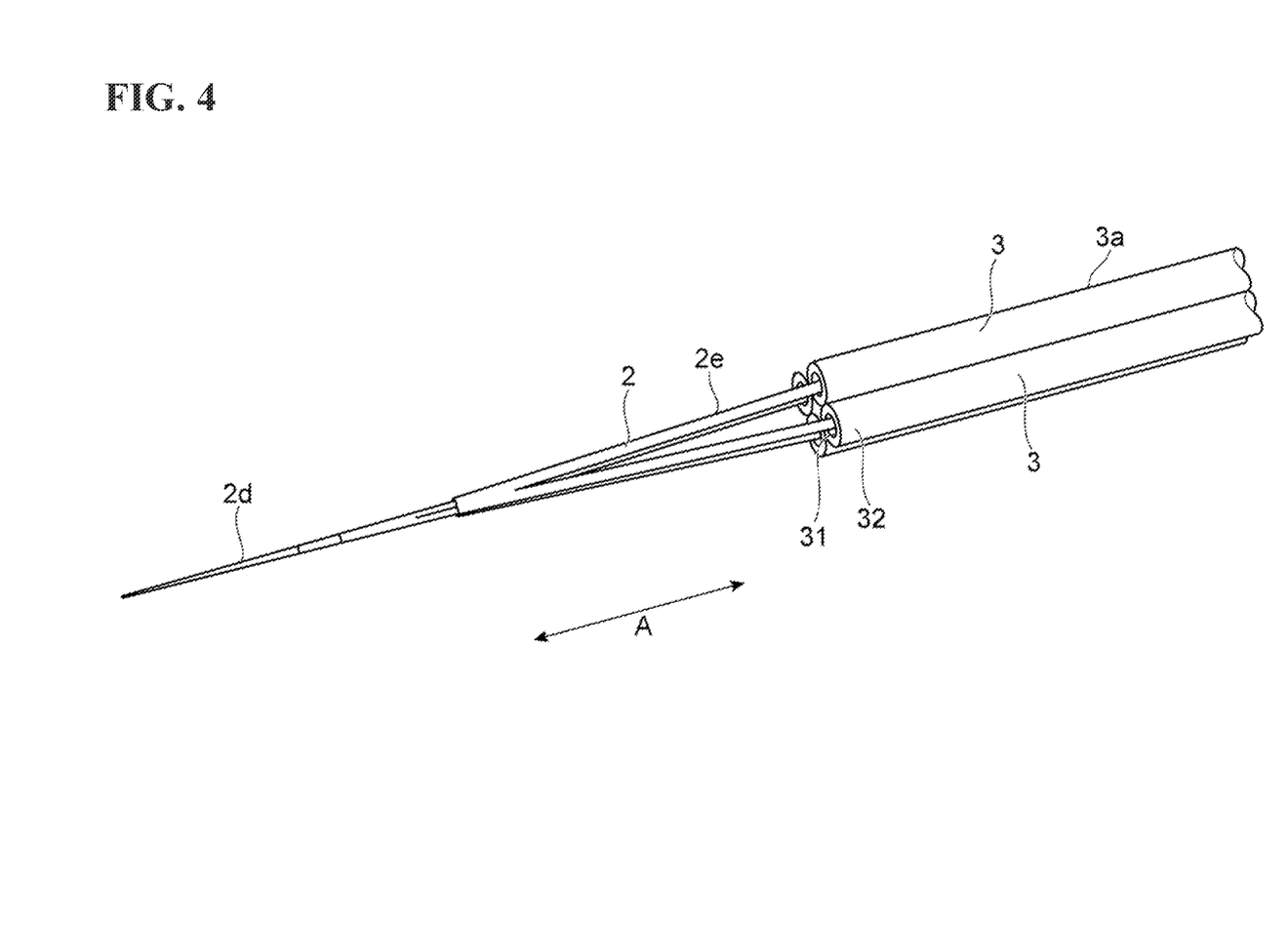
FIG. 4 shows a process for manufacturing an optical fiber bundle connector according to an embodiment.

First, as shown in FIG. 4, each of the plurality of optical fibers 2 is inserted into plastic tube 3. Optical fiber 2 includes a covering portion 2e. Covering portion 2e is removed from tip portion 2d of optical fiber 2, and the diameter of tip portion 2d is made smaller than the typical outside diameter. For example, tip portion 2d is formed by a thinning process using an etching process with hydrofluoric acid water or the like. At least a part of the portion of optical fiber 2 covered with covering portion 2e is accommodated in each plastic tube 3. The plurality of plastic tubes 3 are connected in a bundle shape. The bundle of the plurality of plastic tubes 3 has outer periphery 3a.

Figure 5:
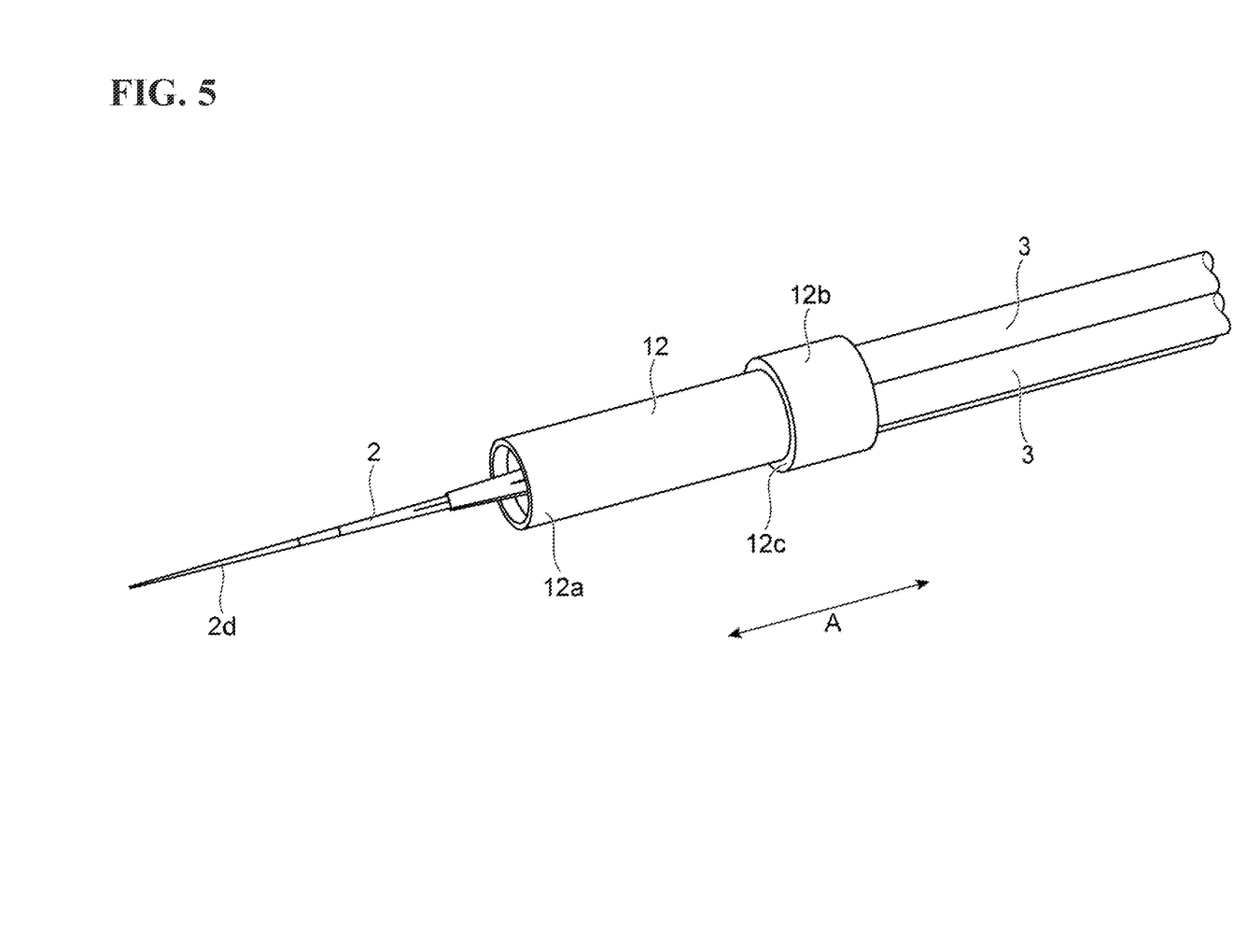
FIG. 5 shows a process for manufacturing an optical fiber bundle connector.

Next, as shown in FIG. 5, each of the plurality of optical fibers 2 is inserted into sleeve 12 of intermediate member 5 starting from tip portion 2d of the plurality of optical fibers 2, and tip portion 32 of plastic tube 3 is held by intermediate member 5. Tip portions 2d of the plurality of optical fibers 2 pass through sleeve 12 and protrude from portion 12a. Tip portion 32 of plastic tube 3 is fixed at portion 12b of sleeve 12.

Figure 6:
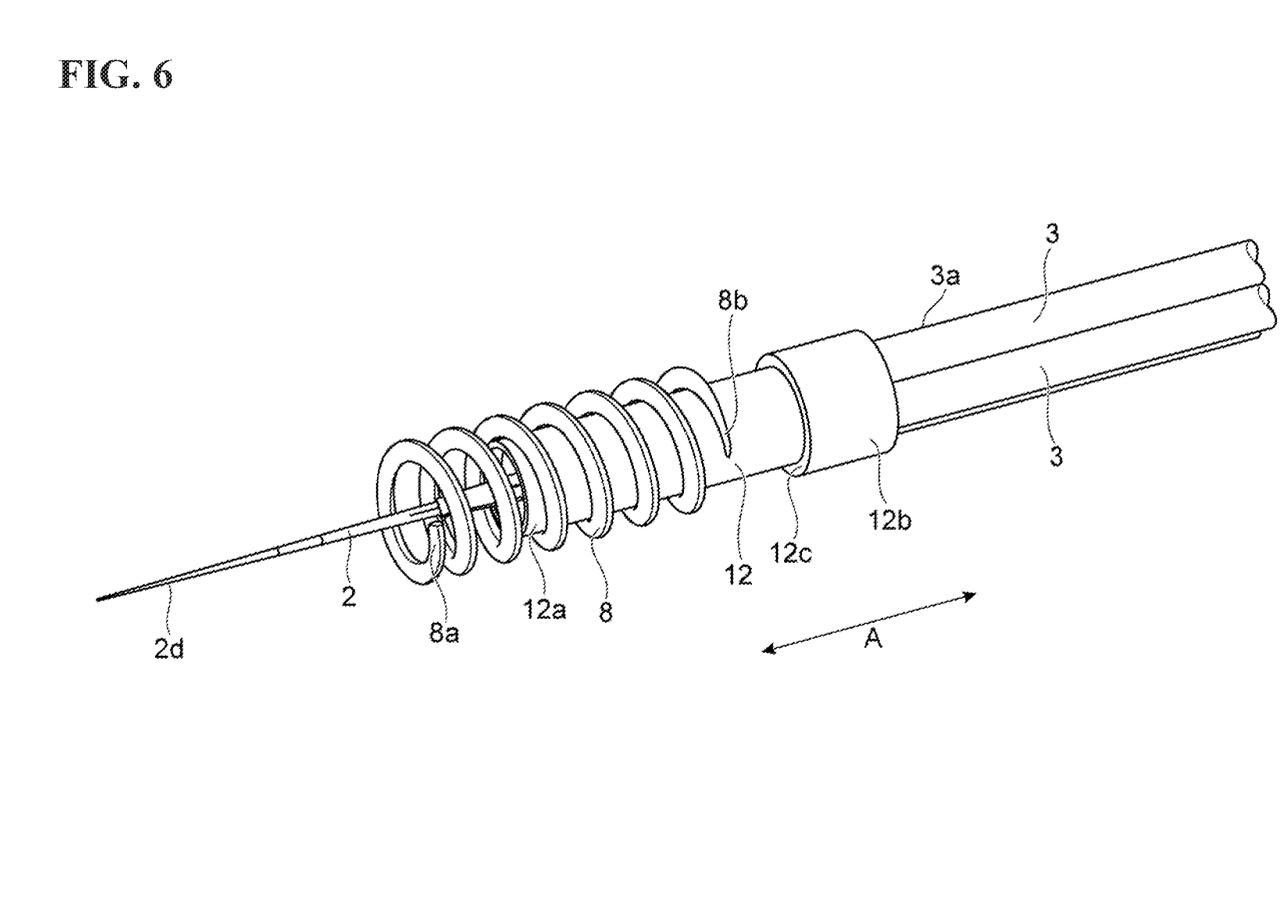
FIG. 6 shows a process for manufacturing an optical fiber bundle connector.

Next, as shown in FIG. 6, coil spring 8 is disposed over the plurality of optical fibers 2 and on portion 12a of sleeve 12. At this time, the plurality of optical fibers 2 and portion 12a of sleeve 12 are inserted into coil spring 8 starting from tip portions 2d of optical fibers 2.

Figure 7:
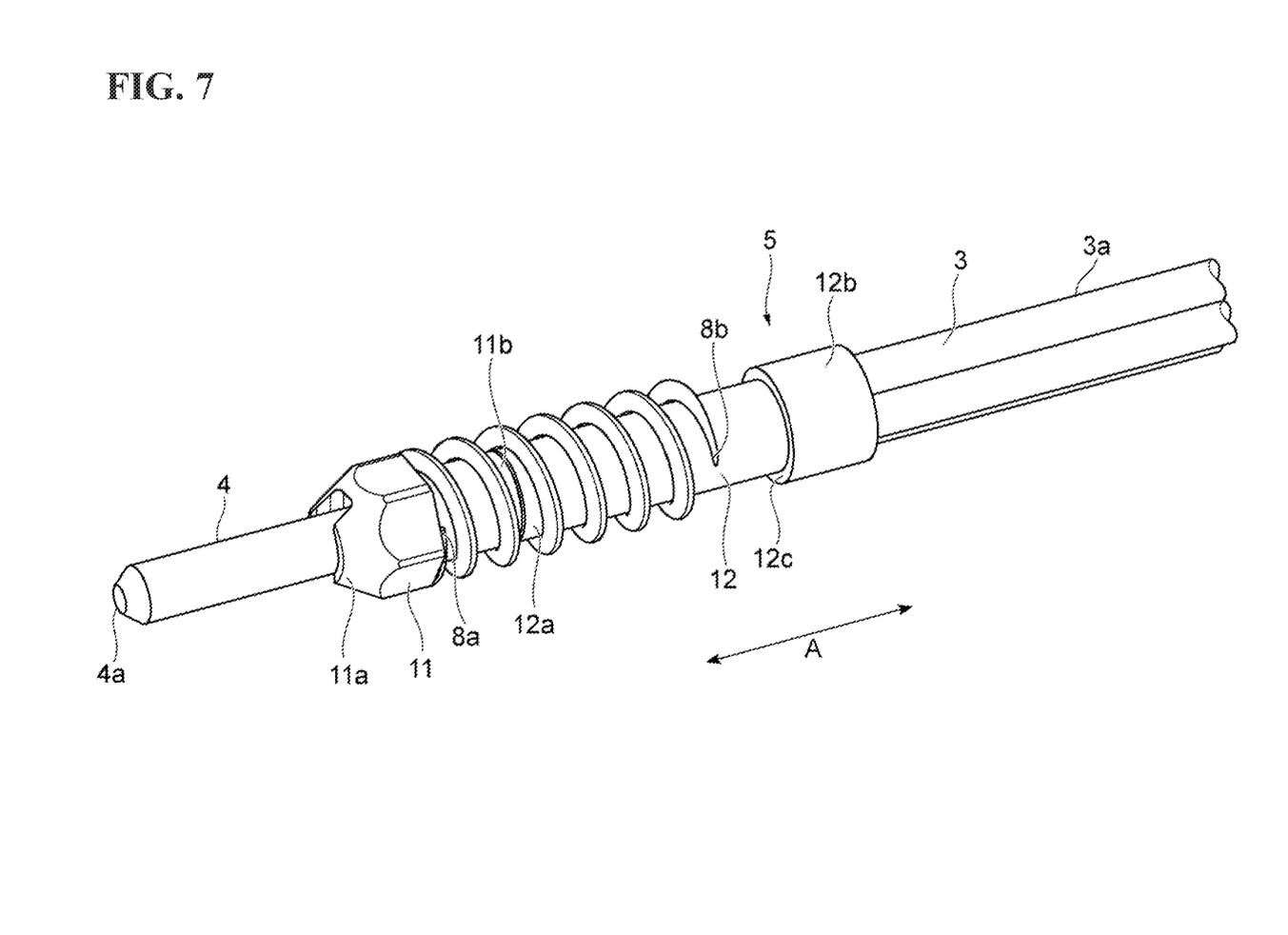
FIG. 7 shows a process for manufacturing an optical fiber bundle connector.

Next, as shown in FIG. 7, tip portions 2d of the plurality of optical fibers 2 are inserted into ferrule 4 and flange 11. Ferrule 4 is held by portion 11a of flange 11. Portion 11b of flange 11 is inserted into coil spring 8. As a result, ferrule 4 is connected to intermediate member 5, and coil spring 8 is disposed around intermediate member 5. Ferrule 4 extends in direction A and holds the tips of the plurality of optical fibers 2.

Figure 8:
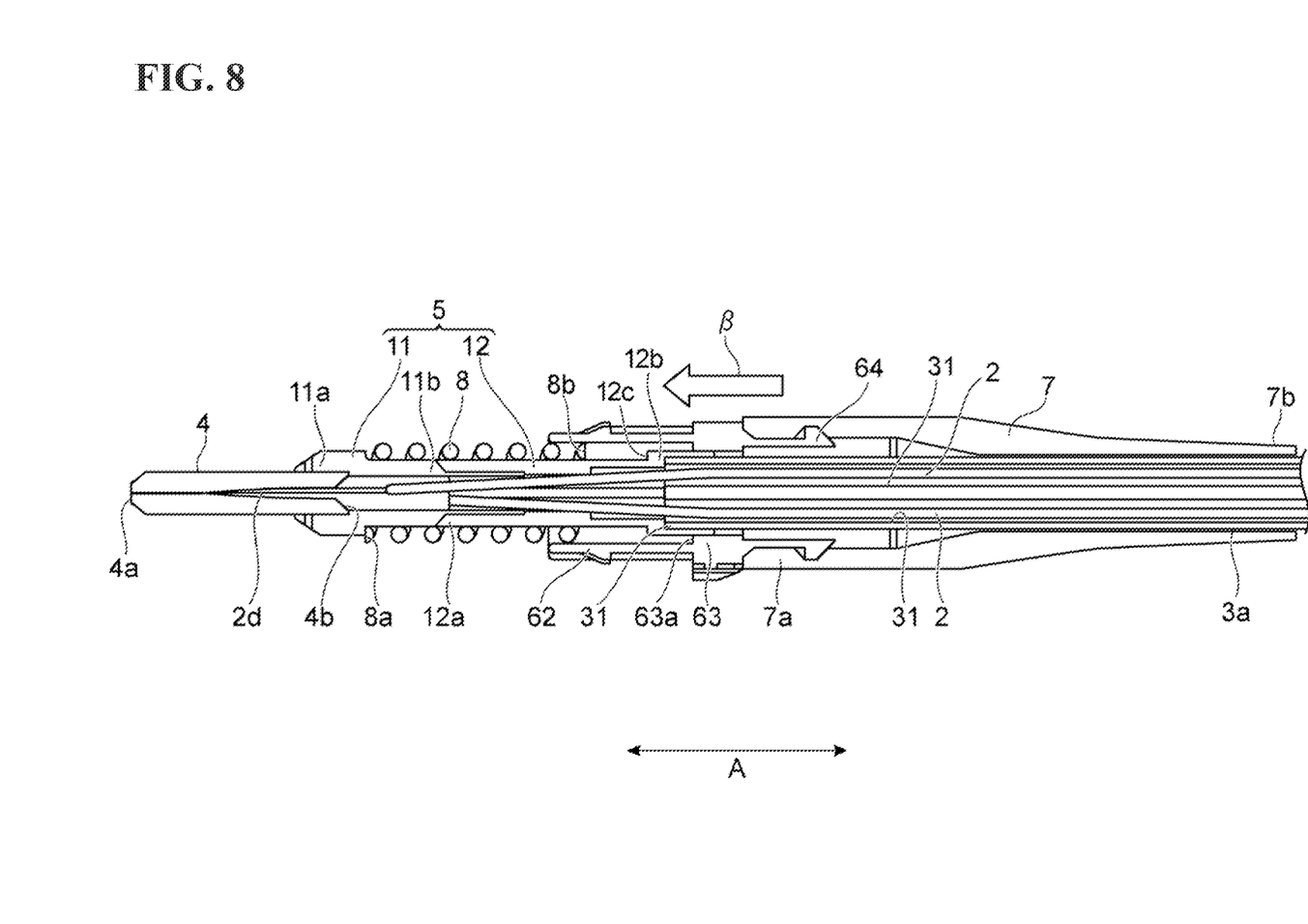
FIG. 8 shows a process for manufacturing an optical fiber bundle connector.
Figure 9:
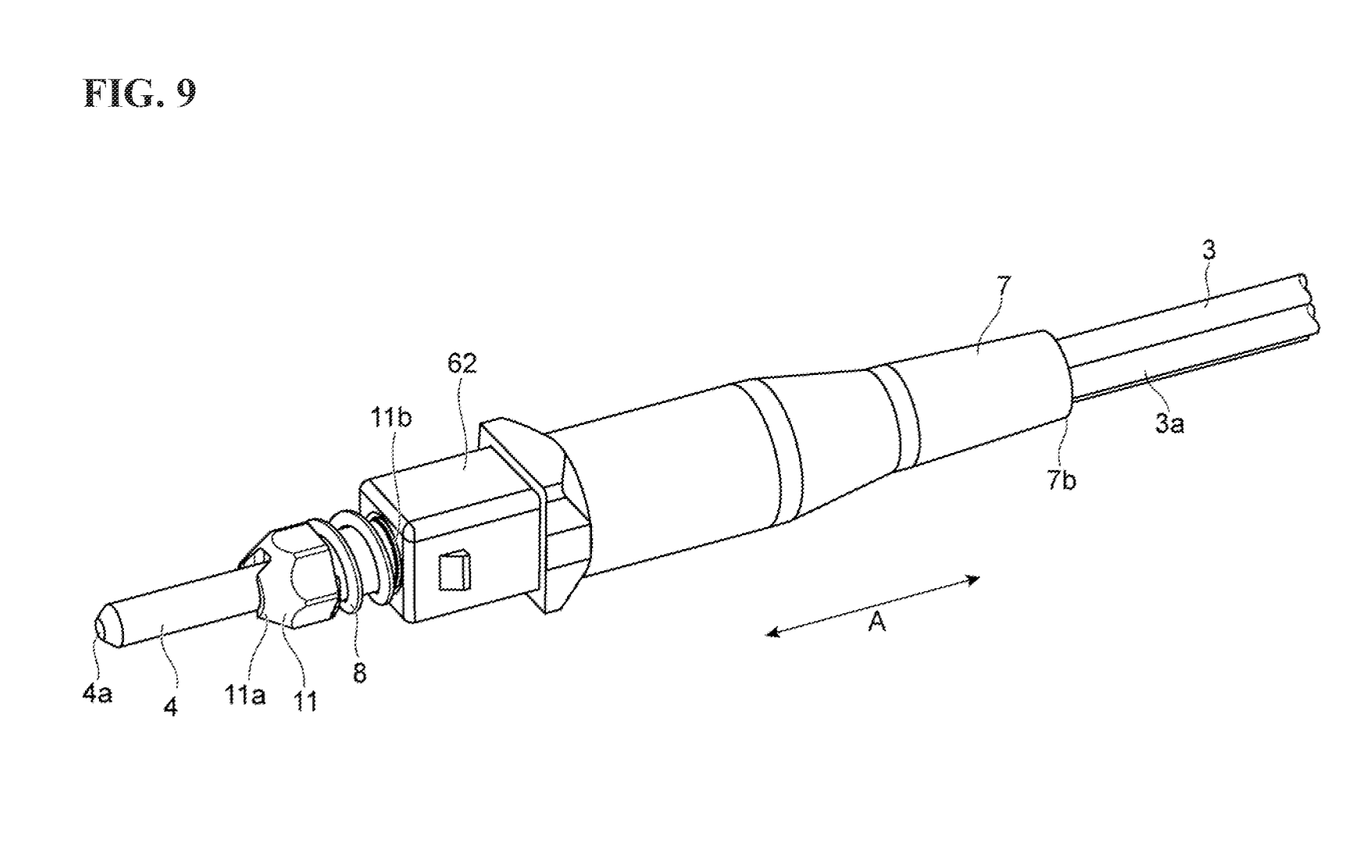
FIG. 9 shows a process for manufacturing an optical fiber bundle connector.

Next, as shown in FIGS. 8 and 9, a portion of intermediate member 5 and a portion of plastic tube 3 are inserted into stopper 62 while rubber boot 7 is held by engaging portion 64 of stopper 62. At this time, stopper 62 is moved in a direction (3, and tip portion 7b of rubber boot 7 slides along outer periphery 3a of plastic tube 3. Portion 12b of sleeve 12 passes inside engaging portion 63 of stopper 62. Tip portion 8b of coil spring 8 abuts against a portion of a contact surface 63a of engaging portion 63. Contact surface 63a is a ring-shaped surface along the outer shape of engaging portion 63.

Figure 10:
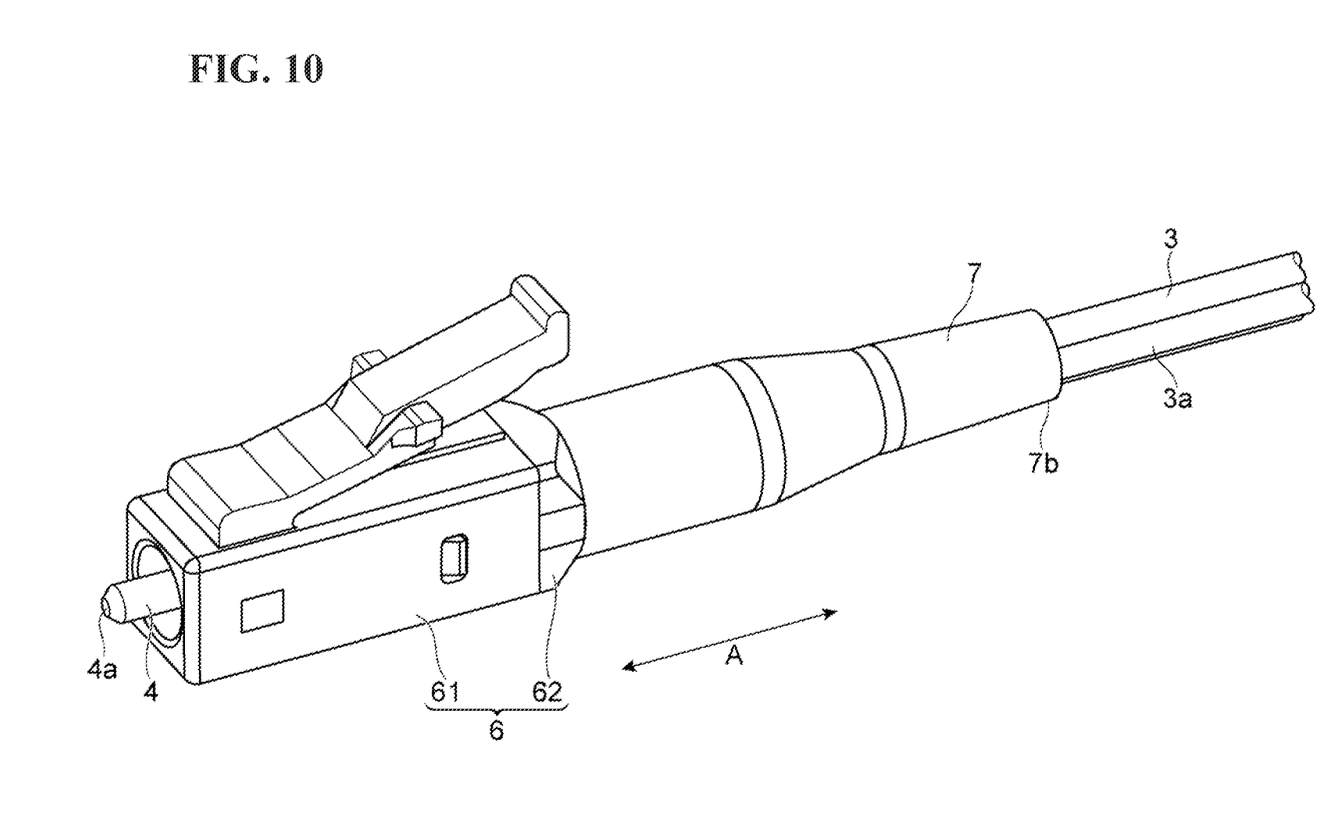
FIG. 10 shows a process for manufacturing an optical fiber bundle connector.

Next, as shown in FIG. 10, plug frame 61 is disposed from the tip side of each of the plurality of optical fibers 2. Ferrule 4 and tip portions 2d of the plurality of optical fibers 2 are inserted into plug frame 61. As a result, at least a part of ferrule 4, intermediate member 5, and at least a part of plastic tube 3 are accommodated in frame member 6, and ferrule 4 is pressed toward the tips of the plurality of optical fibers 2 against the frame member 6 by coil spring 8. As described above, optical fiber bundle connector 1 is manufactured.

The steps by which optical fiber bundle connector 1 is manufactured are not limited to the steps shown in FIGS. 4 to 10 and the order of these steps. For example, before coil spring 8 is disposed, a portion of intermediate member 5 and a portion of plastic tube 3 may be inserted into stopper 62. Before flange 11 and sleeve 12 are fixed to each other, washers abutting against tip portions 8a and 8b of coil spring 8 may be disposed together with coil spring 8.

Coil spring 8 may be inserted from portion 12b side of sleeve 12 together with stopper 62. In this case, the inside diameter of coil spring 8 is configured to be larger than the maximum diameter of portion 12b of sleeve 12. Furthermore, when the inside diameter of engaging portion 63 is larger than the maximum outside diameter of flange 11, coil spring 8 may be disposed around intermediate member 5 to form optical fiber bundle connector 1 even when flange 11 and sleeve 12 are integrally formed.

Next, the operation and the effect of optical fiber bundle connector 1 and the method of manufacturing optical fiber bundle connector 1 will be described.

In optical fiber bundle connector 1, a portion of each of the plurality of optical fibers 2 is inserted into plastic tube 3. Intermediate member 5 connects plastic tubes 3 and ferrule 4. Pressing member 8 is arranged around intermediate member 5. Therefore, optical fiber 2 is protected by plastic tube 3, and damage to optical fiber 2 can be reduced. Plastic tube 3 may move together with ferrule 4 through intermediate member 5. Therefore, bending loss and breakage of optical fiber 2 can be reduced. Even in a configuration in which the plurality of optical fibers 2 are used, a configuration in which plastic tube 3 can move together with ferrule 4 can be easily realized.

In optical fiber bundle connector 1, end portion 4a of ferrule 4 is located closer to the tip side of the plurality of optical fibers 2 than end portion 4b. Intermediate member 5 connects end portion 4b and tip portion 32 of plastic tube 3. In this case, plastic tube 3 can be easily disposed by intermediate member 5.

In optical fiber bundle connector 1, flange 11 holds end portion 4b of ferrule 4. Sleeve 12 is connected to flange 11. Sleeve 12 holds tip portion 32 of plastic tube 3. Frame member 6 may include engaging portion 63 that engages with tip portion 8b of coil spring 8. Engaging portion 63 is formed in a ring shape when viewed from direction A. The inside diameter of engaging portion 63 of frame member 6 is larger than the maximum outside diameter of sleeve 12. In this case, entire sleeve 12 can be passed inside engaging portion 63 of frame member 6.

In optical fiber bundle connector 1, portion 12a of sleeve 12 is connected to flange 11. Portion 12b of sleeve 12 holds tip portion 32 of plastic tube 3. The inside diameter of coil spring 8 is larger than the maximum outside diameter of portion 12a. In this case, at least portion 12a can be inserted into coil spring 8. Therefore, optical fiber bundle connector 1 has a structure in which a configuration in which plastic tube 3 moves together with ferrule 4 with respect to frame member 6 can be easily realized.

In optical fiber bundle connector 1, engaging portion 51 of flange 11 is engaged with tip portion 8a of coil spring 8. The shortest distance L1 between engaging portion 63 of frame member 6 and engaging portion 51 of flange 11 in direction A is shorter than the natural length of coil spring 8. The shortest distance L2 between engaging portion 51 of flange 11 and portion 12b of sleeve 12 in direction A is longer than the natural length of coil spring 8. In this case, optical fiber bundle connector 1 has a configuration in which pressing member 8 presses ferrule 4 toward the tip side of each of the plurality of optical fibers 2 against the frame member 6 is easily realized while being provided with intermediate member 5 including flange 11 and sleeve 12.

In optical fiber bundle connector 1, flange 11 and sleeve 12 may be connected to each other by press-fitting. In this case, the number of steps for connecting flange 11 and sleeve 12 can be reduced as compared with the case where another material such as an adhesive is used. Flange 11 and sleeve 12 may be connected by an adhesive. In this case, flange 11 and sleeve 12 can be more firmly connected to each other. Flange 11 and sleeve 12 may be integrally molded. In this case, the number of steps of disposing intermediate member 5 can be reduced.

In optical fiber bundle connector 1, plastic tube 3 includes a plurality of plastic tubes 3. The plurality of optical fibers 2 are individually inserted into the plurality of plastic tubes 3. In this case, since optical fiber 2 is inserted into each plastic tube 3, each of the plurality of optical fibers 2 is protected by plastic tube 3.

Although the embodiments of the present disclosure have been described in detail above, the present disclosure is not limited to the above-described embodiments and can be applied to various embodiments. For example, a configuration in which ferrule 4 holds four optical fibers 2. However, the number of optical fibers 2 held by ferrule 4 is not limited to this. For example, ferrule 4 may hold three optical fibers 2, seven optical fibers 2, eight optical fibers 2, or may hold 19 optical fibers 2.

The multi-core fiber connector including the MCF has been described as an example of the optical fiber connector to which optical fiber bundle connector 1 is connected. However, the optical fiber connector to which optical fiber bundle connector 1 is connected may be an optical fiber connector having the same configuration as optical fiber bundle connector 1.

What is claimed is:

1. An optical fiber bundle connector comprising:
   a plurality of optical fibers;
   a plastic tube in which a portion of each of the plurality of optical fibers inserted;
   a ferrule extending in a first direction and holding a tip portion of each of the plurality of optical fibers;
   an intermediate member having a cylindrical shape, having the plurality of optical fibers inserted in the intermediate member, and connecting the plastic tube and the ferrule;
   a frame member accommodating at least a portion of the ferrule, the intermediate member, and at least a portion of the plastic tube; and
   a pressing member disposed around the intermediate member and configured to press the ferrule against the frame member toward a tip side of each of the plurality of optical fibers, wherein:
   the intermediate member includes a flange that holds a tip of the ferrule and a sleeve on an opposite side of the flange, the sleeve holding a tip of the plastic tube;
   a shortest distance between the flange and the sleeve is longer than a natural length of the pressing member; and
   a shortest distance between the flange and the frame member is shorter than the natural length of the pressing member, such that the pressing member presses against the frame member rather than against the sleeve.

2. The optical fiber bundle connector according to claim 1,
   wherein the ferrule includes a first end portion and a second end portion that are opposite to each other in the first direction,
   wherein the first end portion is positioned on the tip side of each of the plurality of optical fibers with respect to the second end portion, and
   wherein the intermediate member connects the second end portion and a tip of the plastic tube.

3. The optical fiber bundle connector according to claim 2,
   wherein the intermediate member includes the flange holding the second end portion of the ferrule, and the sleeve connected to the flange and holding the tip of the plastic tube,
   wherein the pressing member includes a coil spring having a first tip portion and a second tip portion,
   wherein the frame member includes an engaging portion having a ring shape when viewed from the first direction and engaging with the first tip portion of the coil spring, and
   wherein an inside diameter of the engaging portion of the frame member is larger than a maximum outside diameter of the sleeve.

4. The optical fiber bundle connector according to claim 3,
   wherein the sleeve includes a first portion connected to the flange and a second portion holding the tip of the plastic tube, and
   wherein an inside diameter of the coil spring is larger than a maximum outside diameter of the first portion.

5. The optical fiber bundle connector according to claim 4,
   wherein the flange includes an engaging portion engaging with the second tip portion of the coil spring,
   wherein the shortest distance between the engaging portion of the frame member and the engaging portion of the flange in the first direction is shorter than a natural length of the coil spring, and
   wherein the shortest distance between the engaging portion of the flange and the second portion of the sleeve in the first direction is longer than the natural length of the coil spring.

6. The optical fiber bundle connector according to claim 3,
   wherein the flange and the sleeve are connected by press-fitting.

7. The optical fiber bundle connector according to claim 3,
   wherein the flange and the sleeve are connected with an adhesive.

8. The optical fiber bundle connector according to any one of claim 3,
   wherein the flange and the sleeve are integrally molded.

9. The optical fiber bundle connector according to claim 1,
   wherein the plastic tube includes a plurality of plastic tubes, each of the plurality of optical fibers being individually inserted into a corresponding one of the plurality of plastic tubes.

10. A method of manufacturing an optical fiber bundle connector, the method comprising:
    inserting each of a plurality of optical fibers, a portion of each of which is accommodated in a plastic tube, into an intermediate member having a cylindrical shape, inserting starting from a tip portion of each of the plurality of optical fibers, and causing a tip portion of the plastic tube to be held by the intermediate member;
    connecting a ferrule extending in a first direction and configured to hold a tip of each of the plurality of optical fibers to the intermediate member, and disposing a pressing member around the intermediate member; and
    accommodating at least a portion of the ferrule, the intermediate member, and at least a portion of the plastic tube in a frame member, and, by the pressing member, pressing the ferrule against the frame member toward a tip side of each of the plurality of optical fibers, wherein:
    the intermediate member includes a flange that holds a tip of the ferrule and a sleeve on an opposite side of the flange, the sleeve holding a tip of the plastic tube;
    a shortest distance between the flange and the sleeve is longer than a natural length of the pressing member; and
    a shortest distance between the flange and the frame member is shorter than the natural length of the pressing member, such that the pressing member presses against the frame member rather than against the sleeve.

* * * * *